(12) United States Patent
Sakata et al.

(10) Patent No.: US 10,065,310 B2
(45) Date of Patent: Sep. 4, 2018

(54) DEVICE AND METHOD FOR CONTROLLING LINK ACTUATION DEVICE

(71) Applicant: NTN CORPORATION, Osaka (JP)

(72) Inventors: Seigo Sakata, Iwata (JP); Yukihiro Nishio, Iwata (JP); Hiroshi Isobe, Iwata (JP); Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 78 days.

(21) Appl. No.: 15/233,409

(22) Filed: Aug. 10, 2016

(65) Prior Publication Data

US 2016/0361816 A1    Dec. 15, 2016

Related U.S. Application Data

(63) Continuation of application No. PCT/JP2015/053739, filed on Feb. 12, 2015.

(30) Foreign Application Priority Data

Feb. 20, 2014   (JP) .................................. 2014-030425

(51) Int. Cl.
   *G05B 15/00*   (2006.01)
   *G05B 19/00*   (2006.01)
   (Continued)

(52) U.S. Cl.
   CPC ........... *B25J 9/1623* (2013.01); *B25J 9/1651* (2013.01); *F16H 21/46* (2013.01)

(58) Field of Classification Search
   CPC ...... B25J 9/1651; B25J 9/1623; B25J 9/1667; F16H 21/46; A61F 2/26; B65D 90/587;
   (Continued)

(56) References Cited

U.S. PATENT DOCUMENTS 7,039,494 B2   5/2006   Otsuki et al.
7,472,622 B2   1/2009   Isobe et al.
(Continued)

FOREIGN PATENT DOCUMENTS

JP   61-168019      7/1986
JP   2004-261886    9/2004
(Continued)

OTHER PUBLICATIONS

International Search Report dated May 19, 2015 in corresponding International Application No. PCT/JP2015/053739.
(Continued)

*Primary Examiner* — Rachid Bendidi

(57) ABSTRACT

In this link actuation device, arms of a plurality of link mechanisms are driven to be rotated by actuators, whereby the posture of a distal end side link hub is changed. A divided section setter divides a trajectory on a work surface on which an end effector works, into a plurality of sections at pass points and sets the sections. An arm rotation speed calculator calculates a rotation speed at which each arm performs constant speed rotation in each section on the basis of: a time period of movement in the section which is determined from a target moving speed and the distance of the section; and a rotation-angular movement amount of the arm in the section. A posture change controller performs positioning control on each actuator so as to cause its corresponding arm to continuously rotate at the corresponding rotation speed without acceleration/deceleration.

7 Claims, 8 Drawing Sheets

(51) Int. Cl.
  *B25J 9/16* (2006.01)
  *F16H 21/46* (2006.01)
(58) Field of Classification Search
  CPC .... A01B 59/048; A01D 34/246; A01D 34/63; A01D 43/77; A01D 43/107; A47C 17/48; Y10S 414/13
  See application file for complete search history.

(56) References Cited

U.S. PATENT DOCUMENTS

| | | | |
|---|---|---|---|
| 9,249,869 B2 | 2/2016 | Isobe et al. | |
| 9,522,469 B2 | 12/2016 | Isobe et al. | |
| 2005/0033459 A1 | 2/2005 | Otsuki et al. | |
| 2005/0159075 A1* | 7/2005 | Isobe | B25J 17/0266 446/104 |
| 2012/0043100 A1* | 2/2012 | Isobe | A61B 17/1631 173/42 |
| 2013/0055843 A1* | 3/2013 | Isobe | F16C 1/02 74/490.04 |
| 2013/0192420 A1 | 8/2013 | Isobe et al. | |
| 2013/0253751 A1 | 9/2013 | Choi et al. | |
| 2014/0224046 A1* | 8/2014 | Isobe | B25J 9/0048 74/89.14 |
| 2015/0088308 A1 | 3/2015 | Isobe et al. | |

FOREIGN PATENT DOCUMENTS

| | | |
|---|---|---|
| JP | 2005-56171 | 3/2005 |
| JP | 2005-144627 | 6/2005 |
| JP | 2012-82937 | 4/2012 |
| JP | 2013-59852 | 4/2013 |
| JP | 2013-198942 | 10/2013 |
| JP | 2013-202725 | 10/2013 |
| JP | 2013-215864 | 10/2013 |

OTHER PUBLICATIONS

Japanese Notification of Reason(s) for Rejection dated Sep. 19, 2017 in corresponding Japanese Patent Application No. 2014-030425.

International Preliminary Report on Patentability dated Sep. 1, 2016 in corresponding International Patent Application No. PCT/JP2015/053739.

Extended European Search Report dated Dec. 21, 2017 in corresponding European Patent Application No. 15751572.7, 10 pgs.

* cited by examiner

PRIOR ART

PRIOR ART

DEVICE AND METHOD FOR CONTROLLING LINK ACTUATION DEVICE

CROSS REFERENCE TO THE RELATED APPLICATION

This application is a continuation application, under 35 U.S.C. § 111(a) of international patent application No. PCT/JP2015/053739, filed Feb. 12, 2015, which claims priority to Japanese patent application No. 2014-030425, filed Feb. 20, 2014, the entire disclosure of which is herein incorporated by reference as a part of this application.

BACKGROUND OF THE INVENTION (Field of the Invention)

The present invention relates to a control device and a control method for a link actuation device to be used in an apparatus, such as an industrial apparatus, that requires a precise and wide operating range.

(Description of Related Art)

As link actuation devices that fast and precisely perform work such as complicated working or processing in a three-dimensional space, there are devices that each include three or more quadric chain link mechanisms to allow movement of two degrees of freedom (for example, Patent Documents 1 to 3 listed below). As shown in FIG. 9, for example, each of such link actuation devices includes: a proximal end side link hub 14; a distal end side link hub 15; and three link mechanisms 11, 12, and 13 which connect these link hubs 14 and 15 to each other. Each link mechanism 11, 12, 13 is composed of: a proximal side end link member 11a, 12a, 13a; a distal side end link member 11b, 12b, 13b; and an intermediate link member 11c, 12c, 13c. Although the proximal side end link member 13a is not shown in FIG. 9, a reference sign is used in the explanation for identification thereof. Hereinafter, the proximal side end link members 11a, 12a, and 13a will be referred to as arms 11a, 12a, and 13a, respectively.

A link actuation device of this type drives three or more link mechanisms 11, 12, and 13 by means of two or more actuators (not shown) such as motors, thereby changing the posture of the distal end side link hub 15 relative to the proximal end side link hub 14 (hereinafter, referred to as "link hub distal end posture", or simply referred to as "posture"). The link hub distal end posture is determined by a bend angle $\theta$ and an angle of traverse $\phi$. The bend angle $\theta$ is the inclination angle of a central axis QB of the distal end side link hub 15 relative to a central axis QA of the proximal end side link hub 14, and the angle of traverse $\phi$ is the angle of traverse of the central axis QB of the distal end side link hub 15 relative to the central axis QA of the proximal end side link hub 14.

Specifically, in order to control the link hub distal end posture, the rotation angle $\beta 1n$, $\beta 2n$, $\beta 3n$ of the arm 11a, 12a, 13a are obtained from the bend angle $\theta$ and the angle of traverse $\phi$, and the actuator that drives the arm 11a, 12a, 13a is caused to determine the position thereof. In the description below, the rotation angle of each arm will be referred to as "arm rotation angle". For example, with respect to a posture A($\theta$a, $\phi$a) and a posture B($\theta$b, $\phi$b) which is different from the posture A shown in FIG. 10, the arm rotation angles respectively corresponding to the postures A and B are obtained as A($\beta 1a$, $\beta 2a$, $\beta 3a$) and B($\beta 1b$, $\beta 2b$, $\beta 3b$) by the following Formula (1) which represents the relationship between the bend angle $\theta$ and the angle of traverse $\phi$, and the arm rotation angle $\beta$.

$$\cos(\theta/2)\sin \beta n - \sin(\theta/2)\sin(\phi+\delta n)\cos \beta n + \sin(\gamma/2) = 0: \quad \text{Formula (1)}$$

$\gamma$ is the angle between the axis of the connection end of the intermediate link member 11c, 12c, 13c rotatably connected to the arm 11a, 12a, 13a and the axis of the connection end of the intermediate link member 11c, 12c, 13c rotatably connected to the distal side end link member 11b, 12b, 13b. $\delta n$ ($\delta 1$, $\delta 2$, $\delta 3$) (not shown) is the separation angle in the circumferential direction of the proximal side end link member 11a, 12a, 13a relative to an arm 11a serving as a reference. When the number of the link mechanisms 11, 12, and 13 is three and the link mechanisms 11, 12, and 13 are arranged at an equal interval in the circumferential direction, the separation angles $\delta 1$, $\delta 2$, and $\delta 3$ of the arms 11a, 12a, and 13a are 0°, 120°, 240°, respectively.

Here, change in posture from the posture A to the posture B is realized by the rotation angles of the arms 11a, 12a, and 13a changing from $\beta 1a$ to $\beta 1b$, from $\beta 2a$ to $\beta 2b$, and from $\beta 3a$ to $\beta 3b$, respectively.

In Patent Document 4 listed below, from a rectangular coordinate system which is perpendicular to the central axis QA of the proximal end side link hub 14 and which is set on the extended line of the central axis QA of the proximal end side link hub 14, the posture (bend angle $\theta$, angle of traverse $\phi$) of the link hub is obtained by using convergence calculation by the method of least squares. This enables positioning of an end effector such as a working machine to an arbitrary coordinates on a work surface (rectangular coordinate plane) on which the end effector works.

RELATED DOCUMENT

Patent Document

[Patent Document 1] Japanese Laid-Open Patent Publication No. 2004-261886
[Patent Document 2] Japanese Laid-Open Patent Publication No. 2005-144627
[Patent Document 3] Japanese Laid-Open Patent Publication No. 2012-082937
[Patent Document 4] Japanese Laid-Open Patent Publication No. 2013-202725

With respect to the link hub distal end posture, in a case where the amount of change in posture from the posture A($\theta$a, $\phi$a) to the posture B($\theta$b, $\phi$b) is large, if uniform motion control is performed in synchronization by simply performing point-to-point control from the posture A to the posture B, positioning is commanded to a position where the arm rotation angle $\beta$ determined by the point-to-point control is greatly different from the arm rotation angle $\beta$ determined by Formula (1), in particular, near an intermediate portion of the trajectory between the posture A and the posture B. This causes interference among the arms 11a, 12a, and 13a, and requires an excessive torque for driving the link mechanisms 11, 12, and 13.

Therefore, a control device has been suggested in which the trajectory between the posture A and the posture B is divided into a plurality of sections respectively corresponding to a plurality of postures, and point-to-point control is performed for each divided section to make change in posture, thereby enabling drive without applying excessive loads to various portions of the link actuation device even when the amount of change in posture is large. For example, when change in posture is to be made by changing the bend angle $\theta$ from −60° to 60° in a state where the angle of traverse $\phi$ is fixed at 15°, the bend angle $\theta$ between A and B is divided such that the trajectory of the link hub distal end posture moving between A and B becomes shortest.

As a specific example, in a case where change in posture is to be made by changing the bend angle θ from −60° to 60° in a state where the angle of traverse is fixed at 15°, if the bend angle θ is divided such that the trajectory of the link hub distal end posture from A to B becomes shortest, the relationship between the arm rotation angle β and the bend angle θ is expressed as solid lines M1 to M3 shown in FIG. 11, by Formula (1). The arm rotation angles β at the bend angles θ (−60°, −45°, −30°, . . . ) in a state where the angle of traverse φ is fixed at 15° are plotted on the solid line M1 to M3.

Meanwhile, the relationship between the arm rotation angle β and the bend angle θ, in a case where change in posture is to be made through point-to-point control by changing the bend angle θ directly from −60° to 60° in a state where the angle of traverse φ is fixed at 15°, is expressed as dotted lines L1 to L3 shown in FIG. 11.

That is, in an example where change in posture is to be made by changing the bend angle θ from −60° to 60° in a state where the angle of traverse φ is fixed at 15°, if change in posture is to be made through point-to-point control, the trajectory of the arm rotation angle β becomes a straight line (L1 to L3) for each arm. On the other hands, the trajectory of the arm rotation angle β, when the bend angle θ is divided, becomes a curve (M1 to M3), whereby each posture is determined. The above described is one example of change in posture. However, when the bend angle θ is divided, the trajectory of each arm rotation angle β does not necessarily become a straight line in all changes in posture. This means that in order to change the link hub distal end posture at a constant speed in sections from the posture A to the posture B, each arm rotation angle β needs to be controlled in a nonlinear manner.

For example, in a case where the work surface for the end effector installed on the distal end side link hub 15 is a spherical surface, the trajectory from the posture A to the posture B is divided into a plurality of sections, and change is continuously made through the divided sections. In this case, the moving speed from the position on the work surface specified by the posture A to the position on the work surface specified by the posture B does not become constant.

Therefore, in a case where laser processing, coating by a dispenser or by ink jet, welding or the like is performed by using a link actuation device that includes three or more quadric chain link mechanisms shown in FIG. 9 and FIG. 10, if the end effector performs operation at an inconstant speed on the work surface, working unevenness, coating unevenness, thickness unevenness in welding or the like occurs.

SUMMARY OF THE INVENTION

An object of the present invention is to solve the above problem and to provide a control device and a control method for a link actuation device that allow, when work is performed with an end effector by using a link actuation device that includes three or more quadric chain link mechanisms, the end effector to perform work while moving at a substantially constant speed on a work surface.

A control device for a link actuation device according to the present invention will be described using the reference signs used in preferable embodiments. A control device 4 for a link actuation device according to the present invention targets the following link actuation device 1 for control. This link actuation device 1 includes: a proximal end side link hub 14; a distal end side link hub 15; and three or more link mechanisms 11-13 which each connects the distal end side link hub 15 to the proximal end side link hub 14 such that a posture of the distal end side link hub 15 can be changed relative to the proximal end side link hub 14. Each of the link mechanisms 11-13 includes: a proximal side end link member 11a-13a having one end rotatably connected to the proximal end side link hub 14; a distal side end link member 11b-13b having one end connected to the distal end side link hub 15; and an intermediate link member 11c-13c having opposite ends rotatably connected to other ends of the proximal side end link member 11a-13a and the distal side end link member 11b-13b, respectively. Each of the link mechanisms 11-13 having such a shape that a geometric model of the link mechanism 11-13 represented by straight lines shows symmetry between a proximal end side portion thereof and a distal end side portion thereof with respect to a center portion of the intermediate link member 11c-13c. Two or more link mechanisms among the three or more link mechanisms 11-13 are each provided with an actuator 3 which arbitrarily changes the posture of the distal end side link hub 15 relative to the proximal end side link hub 14 by causing an arm 11a-13a, forming the proximal side end link member, to rotate, and the distal end side link hub 15 has an end effector 8 installed thereon.

The control device 4 includes: a divided section setter 42 configured to divide, into a plurality of sections at a pass point(s), a trajectory from a start point to an end point along which the end effector 8 moves, the trajectory being on a work surface 60 on which the end effector 8 works, the divided section setter 42 being configured to set a position of each pass point; an arm rotation speed calculator 43 configured to calculate a rotation speed at which each arm 11a, 12a, 13a performs constant speed rotation in each section on the basis of a time period of movement in the section which is determined from a distance of the section and a designated target moving speed V, and a rotation-angular movement amount of the arm 11a, 12a, 13a in the section; and a posture change controller 41 configured to set the rotation speed of the arm 11a-13a in the section to a value of the rotation speed calculated by the arm rotation speed calculator 43, to perform positioning control on the actuator 3 corresponding to the arm 11a-13a so as to cause the arm 11a-13a to continuously rotate without acceleration/deceleration in the section.

According to this configuration, with respect to the movement from the start point to the end point performed by the end effector 8, i.e., the movement from the start point posture A(θa, φa) to the end point posture B(θb, φb) of the distal end side link hub 15, when a plurality of divided sections are to be set by the divided section setter 42, the divided sections are set with reference to the trajectory on the work surface 60 on which the end effector 8 works.

The arm rotation speed calculator 43 calculates, for each movement in each section, the rotation speeds (moving speeds about β1 axis, β2 axis, and β3 axis) at which the respective arms 11a, 12a, and 13a perform constant speed rotation such that the speed of the end effector 8 moving on the work surface 60 becomes the constant target moving speed from the start point to the end point. This rotation speed calculation is performed on the basis of: the time period of the movement in each section which is determined from the designated target moving speed and the distance of the section; and the rotation-angular movement amount of the arm 11a, 12a, 13a in the section. For example, rotation speed=(rotation-angular movement amount)/(movement time period). The target moving speed is a speed set by an operator.

The posture change controller 41 sets the rotation speed of the arm 11a-13a in the section to the calculated rotation speed, to perform positioning control on the actuator 3 corresponding to the arm 11a-13a so as to cause the arm 11a-13a to continuously rotate at the set rotation speed without acceleration/deceleration in the section.

Accordingly, it is possible for the end effector to operate at a substantially constant speed along a plurality of points on the flat work surface (rectangular coordinates) on which the end effector works. That is, the positioning control from the start point to the end point is performed such that the end effector passes arbitrary intermediate points on the work surface 60 without acceleration/deceleration. Thus, for example, if a laser processing head, a dispenser, an ink jet nozzle, a welding machine or the like is mounted on the link as the end effector, it is possible to prevent occurrence of laser processing unevenness, coating unevenness due to a dispenser or ink jet, and welding unevenness due to welding.

It should be noted that division number for sections is set such that the speed of the end effector 8 moving on the work surface 60 becomes a substantially constant speed. In other words, a "substantially constant speed" is an "approximately constant speed", and except the operation start time near the start point and the operation end time near the end point, the speed does not change to an extent that the speed can be considered as being constant from the viewpoint of work performed by the end effector 8.

Setting of sections by the divided section setter 42 may be performed by inputting the respective pass points through a command input device 40. Alternatively, the divided section setter 42 may set sections by obtaining the respective pass points through calculation.

When the arm 11a-13a is focused, there is a difference between the arm rotation speed in a section and the arm rotation speed in the next, and between adjacent sections, acceleration/deceleration of arm rotation occurs. However, movement of the end effector 8 on the work surface 60 becomes an approximately constant speed that allows acceleration/deceleration in the arm 11a-13a to be ignored.

The work surface 60 may be a flat surface, a spherical surface, or another type of surface. When the work surface 60 is a flat surface, the arm rotation speed calculator may calculate the rotation speed of the arm toward a point that is one of the start point, the end point, and the pass points, on the basis of: a time period which is obtained from the target moving speed and a distance between arbitrary two points in a rectangular coordinate system representing the work surface 60, and the rotation-angular movement amount of the arm between the two points. Accordingly, when the work surface 60 is a flat surface, the rotation speed of each arm in its corresponding section can be appropriately calculated.

When the work surface 60 is a spherical surface, the arm rotation speed calculator may calculate the rotation speed of the arm toward a point that is one of the start point, the end point, and the pass points, on the basis of: a time period which is obtained from the target moving speed and a movement amount between arbitrary two points obtained through spherical trigonometry; and the rotation-angular movement amount of the arm between the two points. Accordingly, when the work surface 60 is a spherical surface, the rotation speed of each arm can be accurately and easily calculated.

In the present invention, a configuration may be employed in which section correspondence setting information memory 46 is provided which stores, with respect to the position of the pass point corresponding to the section and the rotation speed of the arm 11a, 12a, 13a in the section, values calculated before actual use of the link actuation device 1, in which case during the actual use, the posture change controller 41 performs control by reading out the position of the pass point and the rotation speed of the arm 11a, 12a, 13a which are stored in the section correspondence setting information memory 46.

There are cases where the same work is repeated by using the link actuation device 1. In such a case, if the rotation speeds of the arms 11a, 12a, 13a in each section is stored in the section correspondence setting information memory 46 in advance, and the posture change controller 41 performs control by reading out the stored contents, it is not necessary to perform setting of sections and calculation of the rotation speeds every time, and thus, control can be performed quickly by a simple device. Even when work is performed only once, there are cases where it is convenient that sections and arm rotation speeds are calculated and set in advance.

In the case of this configuration, the divided section setter 42 and the arm rotation speed calculator 43 may be provided in another computer separate from the computer where the posture change controller 41 is provided. The above "during the actual use" means the time when working or processing is actually performed by the end effector 8.

A control method for a link actuation device according to the present invention is performed in the following manner. That is, the control method for the link actuation device includes: dividing, into a plurality of sections at a pass point(s), a trajectory from a start point to an end point along which the end effector 8 moves, the trajectory being on the work surface 60 on which the end effector 8 works; calculating a rotation speed of each arm 11a, 12a, 13a in each section, on the basis of: a time period of movement in the section which is determined from a distance of the section and a designated target moving speed; and a rotation-angular movement amount of the arm 11a, 12a, 13a in the section; and setting the rotation speed of the arm in the section to a calculated value of the rotation speed, to perform positioning control on the actuator 3 corresponding to the arm 11a, 12a, 13a so as to cause the arm 11a, 12a, 13a to continuously rotate without acceleration/deceleration in the section, thereby causing the end effector 8 to operate at a substantially constant speed from the start point to the end point through the plurality of sections between a plurality of points on the work surface 60.

According to this control method, as is the case with the control device according to the present invention, the end effector 8 can work while moving at a substantially constant speed on the work surface 60.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

<First Embodiment>

Figure 1:
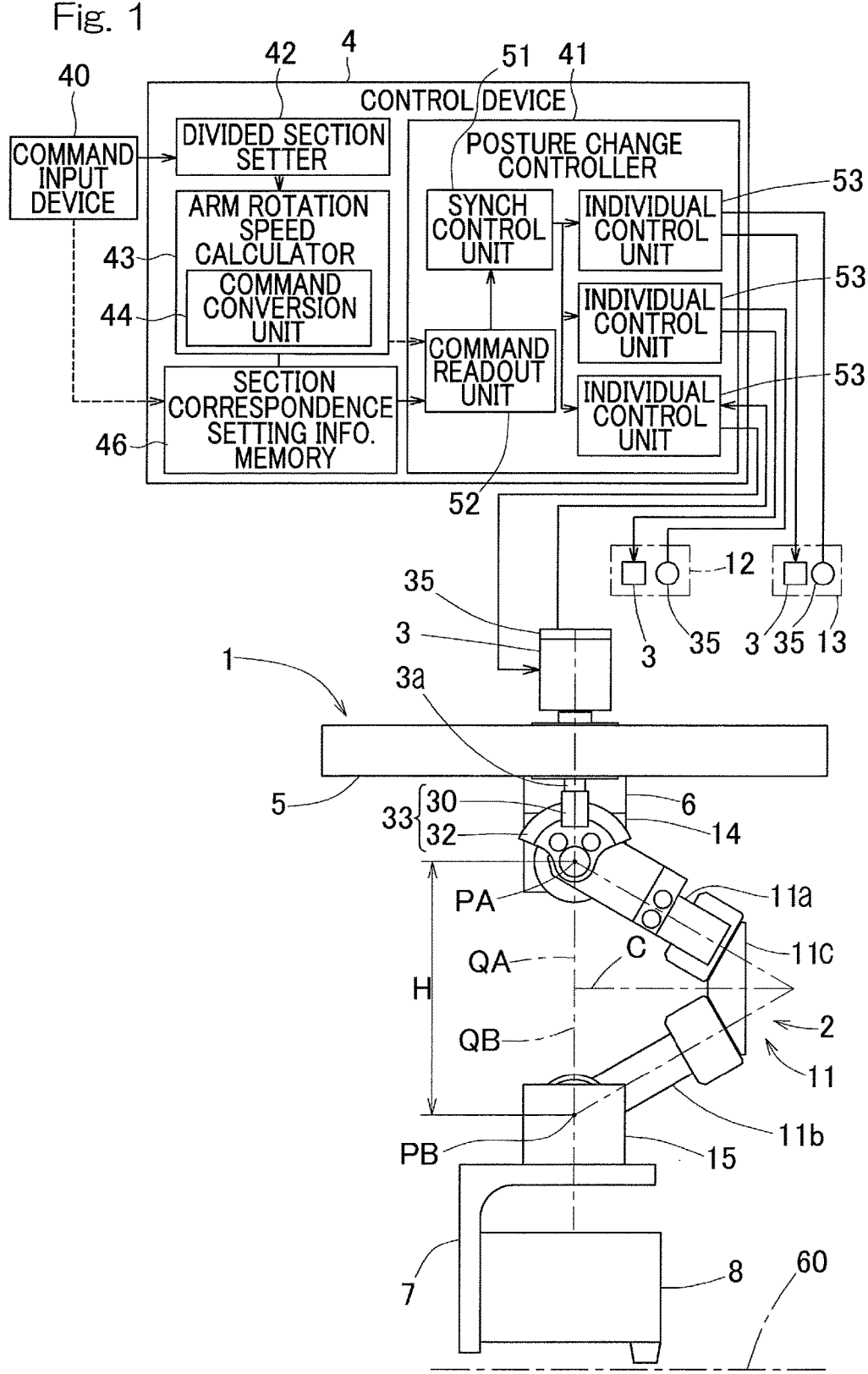
FIG. 1 is an explanatory drawing combining a block diagram of a control device for a link actuation device according to a first embodiment of the present invention and a partially omitted front view of the link actuation device to be controlled.
Figure 2:
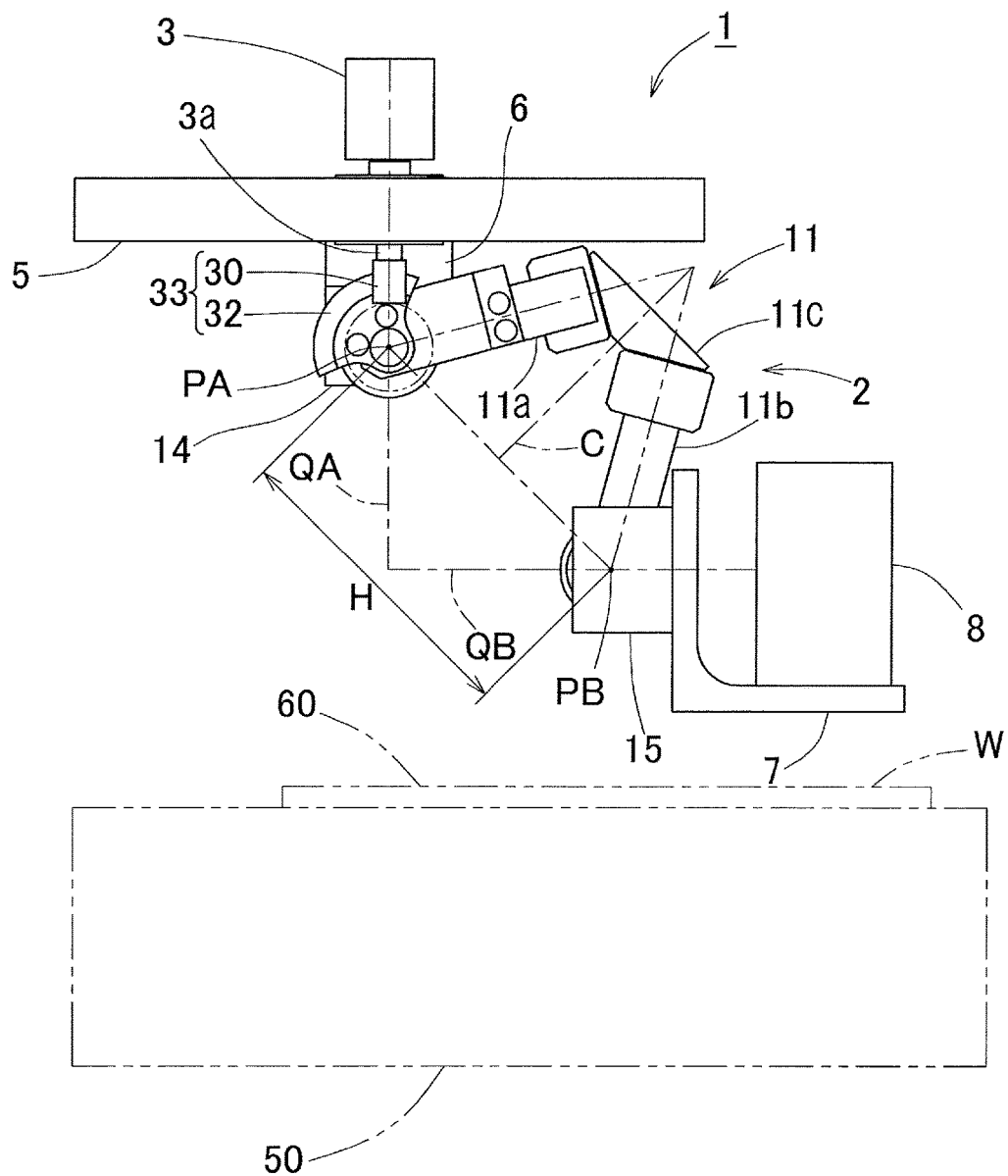
FIG. 2 is a partially omitted front view showing an operation state different from that in FIG. 1 of the link actuation device.

A control device and a control method for a link actuation device according to a first embodiment of the present invention will be described with reference to the drawings. First, the link actuation device to be controlled will be described with reference to FIG. 1 to FIG. 5. As shown in FIG. 1 and FIG. 2, this link actuation device 1 includes a link actuation device body 2 and a plurality of posture control actuators 3 which causes the link actuation device body 2 to actuate. These posture control actuators 3 are controlled by a control device 4. In the present embodiment, the link actuation device body 2 is installed in a suspended manner to a support member 5 via a spacer 6, on the proximal end side of the link actuation device body 2.

On the distal end side of the link actuation device body 2, an end effector 8 is mounted via a distal end mounting member 7. Each actuator 3 is a servomotor, for example, and includes a position detector 35. The end effector 8 is, for example, a laser processing head, a dispenser, an ink jet nozzle, a welding torch or the like, and performs work on a work surface 60 which is a surface of a work piece W on a table device 50 (FIG. 2).

Figure 3:
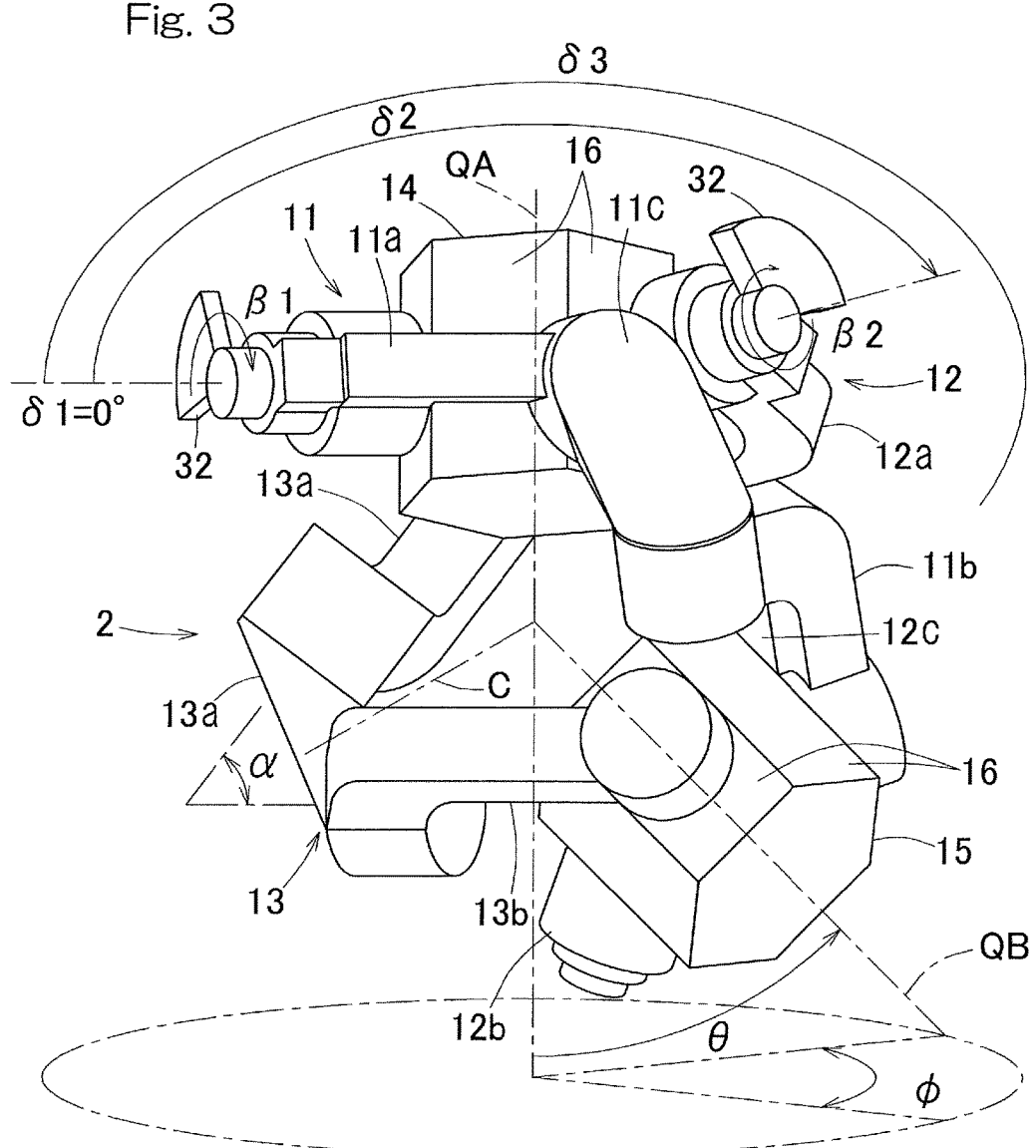
FIG. 3 is a perspective view showing a link actuation device body of the link actuation device.
Figure 9:
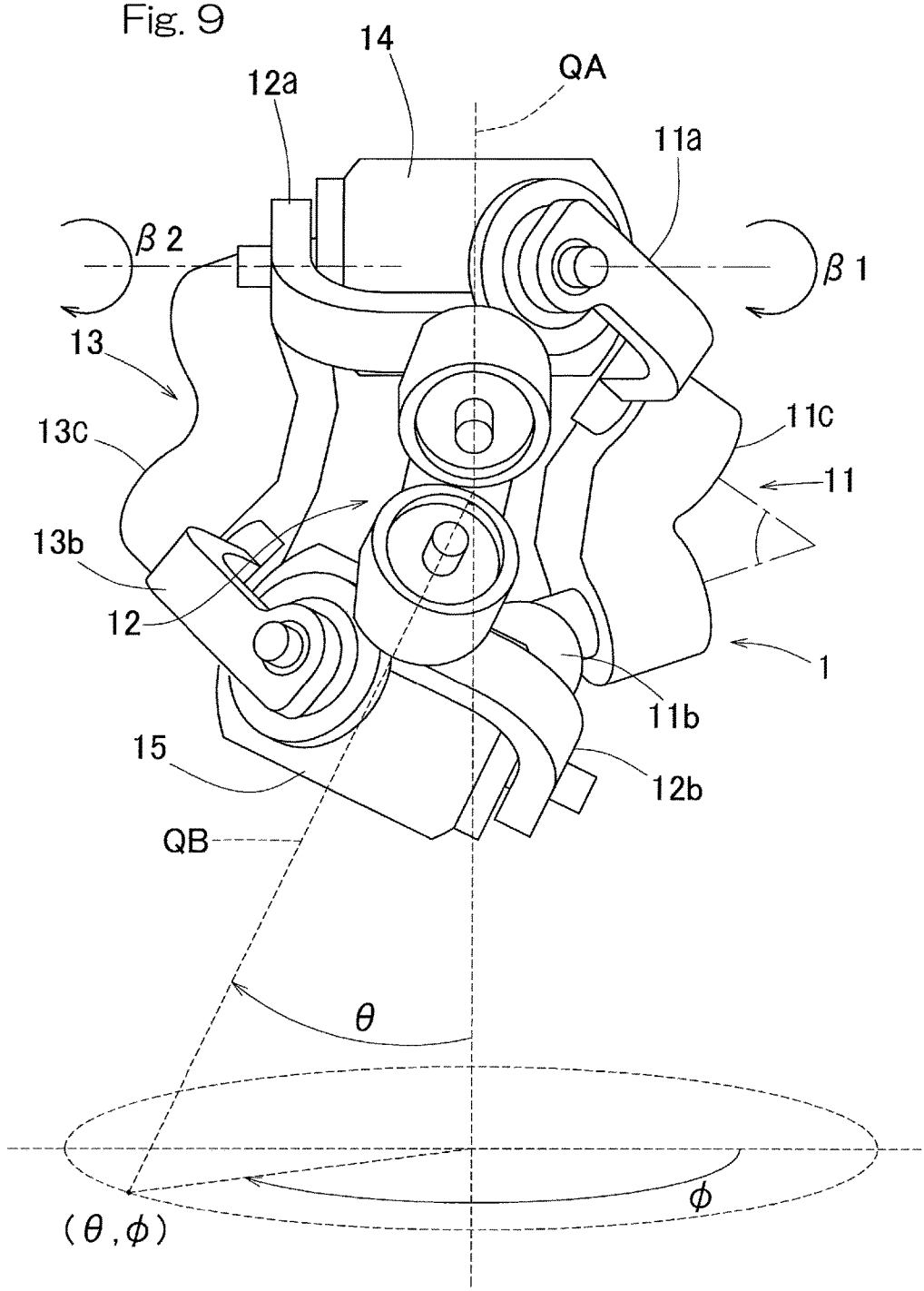
FIG. 9 is a perspective view of one example of a conventional link actuation device provided with three or more quadric chain link mechanisms.
Figure 10:
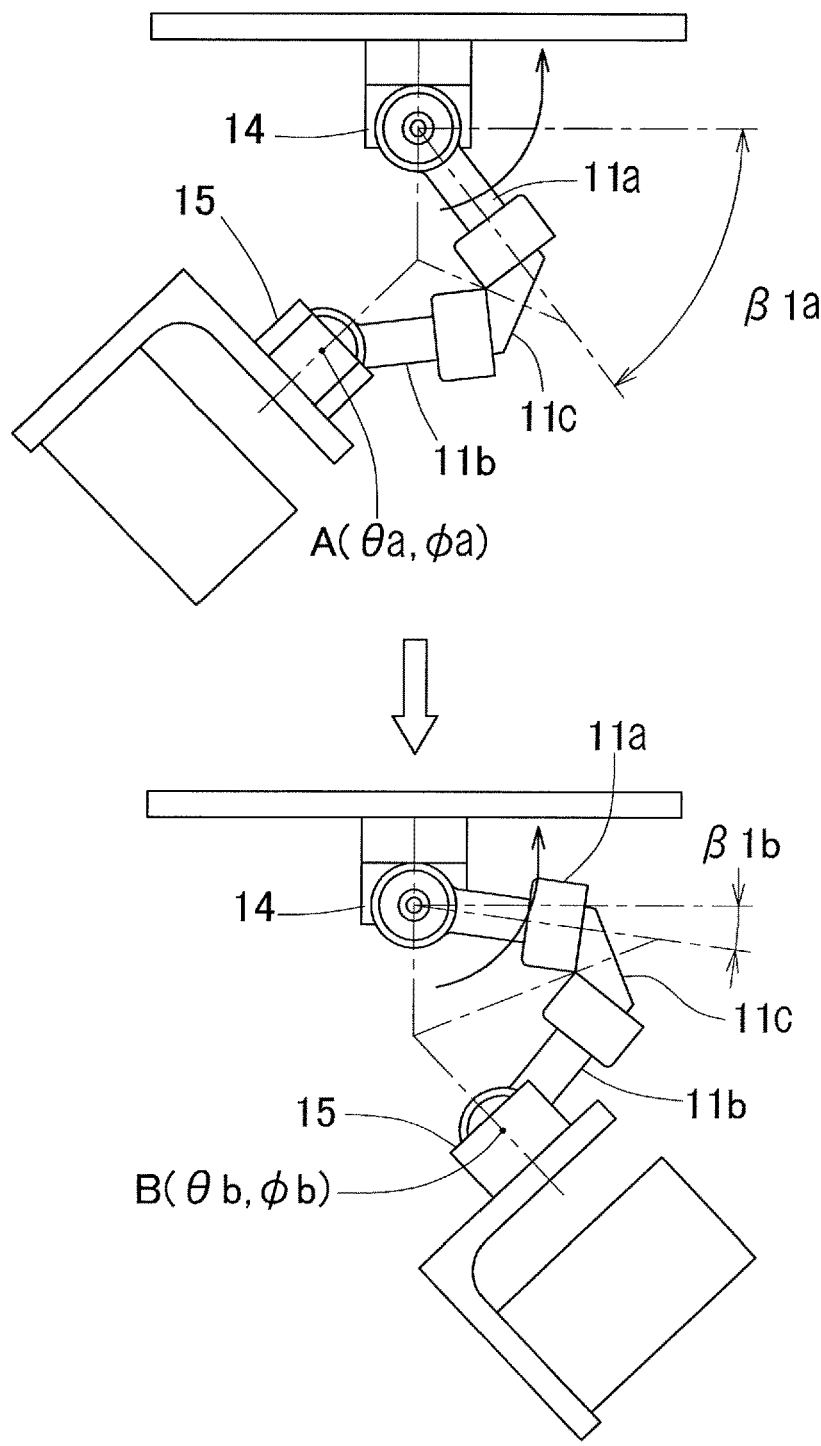
FIG. 10 is an explanatory drawing of posture changing operation of the link actuation device.
Figure 11:
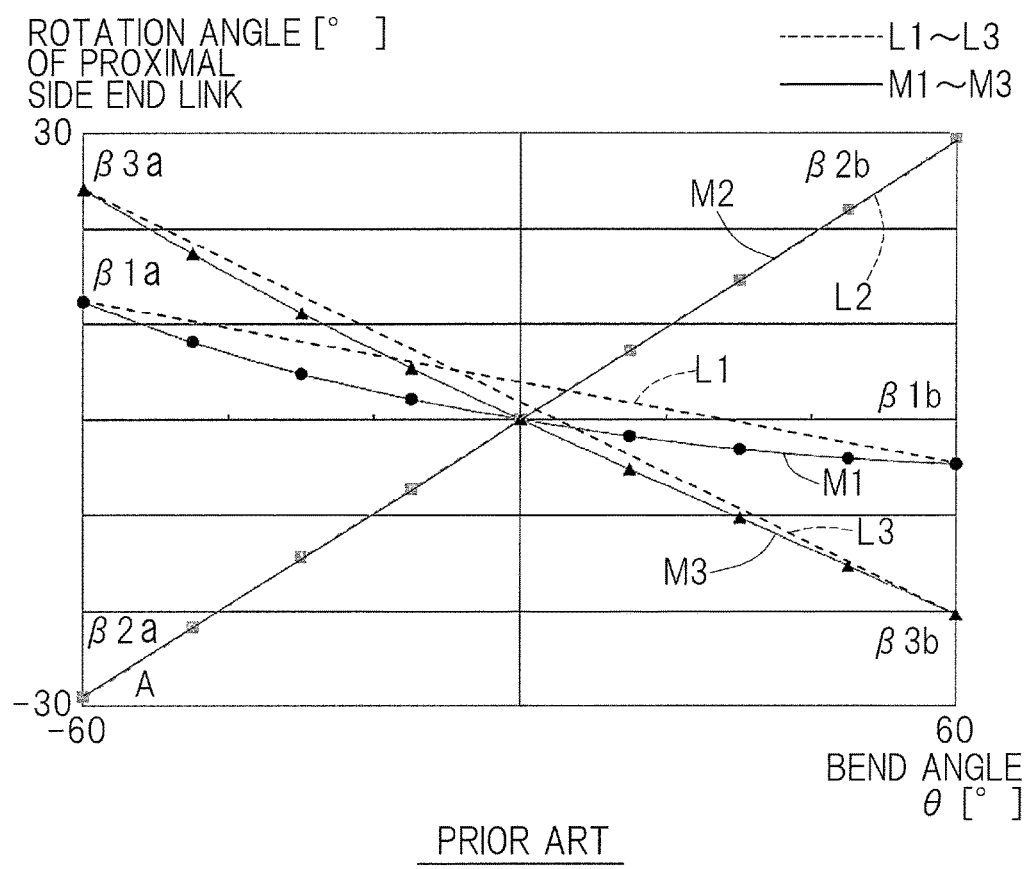
FIG. 11 shows the relationship between the bend angle and the rotation angle of a proximal side end link at the time when the posture of the link actuation device is changed.

The link actuation device body 2 basically has the same configuration as the above-described link actuation device 1 shown in FIG. 9. Although some explanations may be repeated, the structure of each part will be described in more detail. As shown in FIG. 3, the link actuation device body 2 includes three link mechanisms 11, 12, and 13 (hereinafter, expressed as "11-13"). In FIG. 1 and FIG. 2, regarding the shape of the link mechanisms, only the link mechanism 11 is shown. In FIG. 1, the other two link mechanisms 12 and 13 are indicated by double-dotted line rectangles for describing control.

Each link mechanism 11, 12, 13 includes: a proximal side end link member 11a, 12a, 13a (hereinafter, expressed as "11a-13a"); an intermediate link member 11c, 12c, 13c (hereinafter, expressed as "11c-13c"); and a distal side end link member 11b, 12b, 13b (hereinafter, expressed as "11b-13b"), and forms a quadric chain link mechanism composed of four revolute pairs.

The proximal side end link member 11a-13a and the distal side end link member 11b-13b each have an L-shape. One end of the proximal side end link member 11a-13a is rotatably connected to the proximal end side link hub 14, and one end of the distal side end link member 11b-13b is rotatably connected to the distal end side link hub 15. The other end of the proximal side end link member 11a-13a and the other end of the distal side end link member 11b-13b are rotatably connected to the opposite ends of the intermediate link member 11c-13c, respectively.

Each of the proximal end side link hub 14 and the distal end side link hub 15 has a hexagonal columnar shape. To three side surfaces 16, each being every other side surface among six side surfaces 16 forming the outer peripheral surface of each of the proximal end side link hub 14 and the distal end side link hub 15, the proximal side end link members 11a-13a and the distal side end link members 11b-13b are rotatably connected, respectively. The proximal side end link member 11a-13a serves as an arm, and may be referred to as "arm 11a-13a" in the description below.

These three link mechanisms 11-13 have a geometrically identical configuration. That is, each link mechanism 11-13 has the following shape in which: in a geometric model depicted in straight lines representing the proximal side end link member 11a-13a, the distal side end link member 11b-13b and the intermediate link member 11c-13c, the proximal end side portion thereof and the distal end side portion thereof are symmetrical with each other with respect to the center portion of the intermediate link member 11c-13c.

The link actuation device body 2 is formed by combining two spherical link mechanisms. The central axes of the revolute pairs between the proximal end side link hub 14 and the proximal side end link members 11a-13a and the central axes of the revolute pairs between the proximal side end link members 11a-13a and the intermediate link members 11c-13c cross each other at their corresponding spherical link centers PA (FIG. 1, FIG. 2) on the proximal end side. The central axes of the revolute pairs between the distal end side link hub 15 and the distal side end link members 11b-13b and the central axes of the revolute pairs between the distal side end link members 11b-13b and the intermediate link members 11c-13c cross each other at their corresponding spherical link centers PB (FIG. 1, FIG. 2) on the distal end side.

Further, the distance from the proximal end side spherical link center PA to the revolute pair between the proximal end side link hub 14 and the respective proximal side end link member 11a-13a are identical. The distance from the distal end side spherical link center PB to the revolute pair between the distal end side link hub 15 and the respective distal side end link member 11b-13b are identical. Further, the distances from the proximal end side spherical link center PA to the revolute pairs between the proximal side end link members 11a-13a and the intermediate link member 11c-13c are identical. The distances from the distal end side spherical link center PB to the revolute pairs between the distal side end link members 11b-13b and the intermediate link member 11c-13c are identical. The central axes of the revolute pairs between the proximal side end link members 11a-13a and the intermediate link member 11c-13c and the central axes of the revolute pairs between the distal side end link members 11b-13b and the intermediate link member 11c-13c may form a certain cross angle α, or may be parallel.

Figure 4:
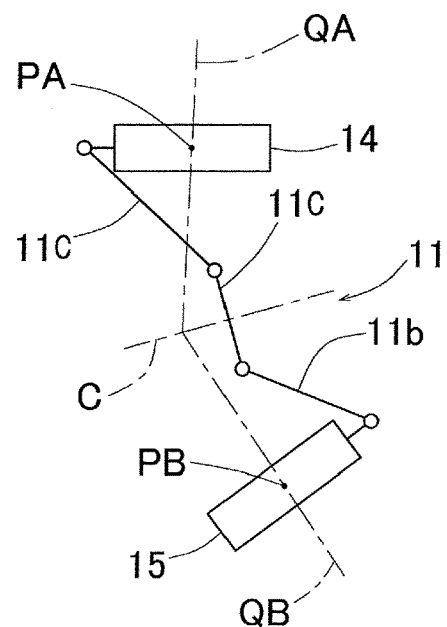
FIG. 4 is a diagram showing a geometric model depicted in straight lines representing one link mechanism of the link actuation device.

That is, the three link mechanisms 11-13 have a geometrically identical configuration. The geometrically identical configuration means that a geometric model depicted in straight lines representing the link members 11a-13a, 11b-13b, 11c-13c, i.e., a model depicted with the revolute pairs and straight lines connecting these revolute pairs, represents a shape in which the proximal end side portion thereof and the distal end side portion thereof are symmetrical with each other with respect to the center portion of the intermediate link member 11c-13c. FIG. 4 is a diagram showing one link mechanism 11 depicted in straight lines.

The link mechanism 11-13 in the present embodiment is of a rotation symmetrical type, and employs a positional configuration in which a proximal side positional relationship between the proximal end side link hub 14 and the proximal side end link member 11a-13a, and a distal side positional relationship between the distal end side link hub 15 and the distal side end link member 11b-13b are in rotation symmetry relative to a center line C of the intermediate link member 11c-13c. FIG. 1 shows a state where the central axis QA of the proximal end side link hub 14 and the central axis QB of the distal end side link hub 15 are on the same line. FIG. 2 shows a state where the central axis QB of the distal end side link hub 15 has a predetermined operating angle relative to the central axis QA of the proximal end side link hub 14. Even when the posture of each link mechanism 11-13 changes, a distance H between the proximal end side spherical link center PA and the distal end side spherical link center PB does not change.

Figure 5:
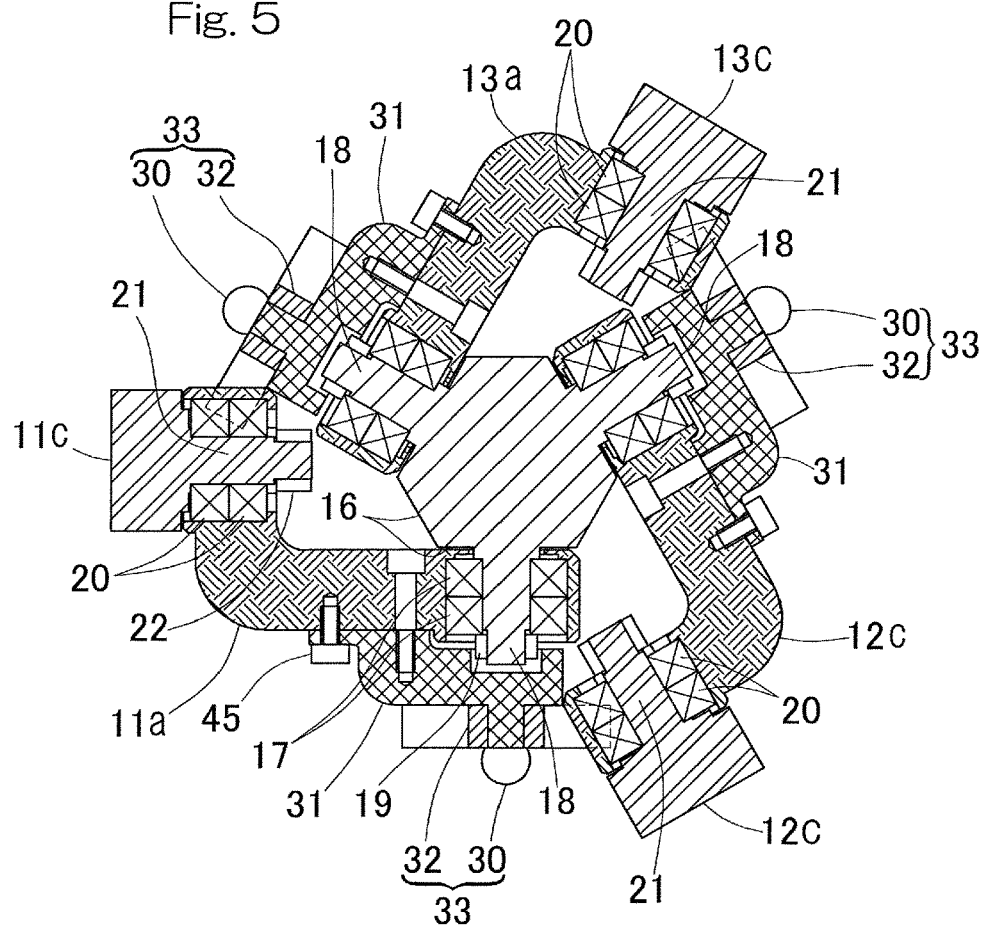
FIG. 5 is a cross-sectional view of a proximal end side link hub, a proximal side end link member, and an intermediate link member of the link actuation device.

FIG. 5 is a cross-sectional view showing the connection portion between the proximal end side link hub 14 and the proximal side end link members 11a-13a. A shaft portion 18 protrudes from the side surface 16 of the proximal end side link hub 14. The inner rings (not shown) of double row bearings 17 are externally fitted on this shaft portion 18, and the outer rings (not shown) of the bearings 17 are internally fitted to one end portion of the proximal side end link member 11a-13a on the proximal end side link hub 14 side. That is, each inner ring is fixed to the proximal end side link hub 14, and each outer ring rotates together with the proximal side end link member 11a-13a.

Each bearing 17 is a ball bearing such as, for example, a deep groove ball bearing, an angular contact ball bearing or the like, and is fixed under a predetermined amount of preload applied by being fastened with a nut 19. Other than the double row ball bearings, a roller bearing or a slide bearing may be used as the bearing 17. The connection portion between the distal end side link hub 15 and the distal side end link member 11b-13b also has the same structure.

Also, the proximal side end link member 11a-13a and the intermediate link member 11c-13c are rotatably connected to each other via a double row bearings 20. That is, the outer rings (not shown) of the bearings 20 are internally fitted to the other end of the proximal side end link member 11a-13a, and the inner rings (not shown) of the bearings 20 are externally fitted on a shaft portion 21 provided in the intermediate link member 11c-13c. Each bearing 20 is a ball bearing such as, for example, a deep groove ball bearing, an angular contact ball bearing or the like, and is fixed under a predetermined amount of preload by being fastened with a nut 22. Other than the double row ball bearings, a roller bearing or a slide bearing may be used as the bearing 20. The connection portion between the distal side end link member 11b-13b and the intermediate link member 11c-13c also has the same structure.

In the link mechanism 11-13, when the following conditions (1) to (3) are satisfied, if the proximal side angular positional relationship between the intermediate link member 11c-13c and the proximal and distal side end link members 11a-13a and the distal side angular positional relationship between the intermediate link member 11c-13c and the distal and distal side end link members 11b-13b with respect to the symmetry plane of the intermediate link member 11c-13c is made identical with each other. In such a case, due to the geometrical symmetry, the proximal side composed of the proximal end side link hub 14 and the proximal side end link member 11a-13a, and the distal side composed of the distal end side link hub 15 and the distal side end link member 11b-13b will move in the same manner. Accordingly, the same rotation angle is realized on the proximal end side and the distal end side, and rotation at a constant speed will be realized. The symmetry plane of the intermediate link member 11c-13c at the time of this constant speed rotation is a constant velocity bisecting plane.

(1) The angle and the length (length from the spherical link center PA, PB) of the shaft portions 18 of the proximal and distal side end link members 11a-13a, 11b-13b are identical to each other.

(2) The geometric shape of the proximal side end link member 11a-13a and the geometric shape of the distal side end link member 11b-13b are identical to each other.

(3) With respect to the intermediate link member 11c-13c, the shape on the proximal end side and the shape on the distal end side are identical to each other.

Therefore, by arranging, along the circumference, a plurality of the link mechanisms 11-13 having the same geometric shape and commonly using the proximal end side link hub 14 and the distal end side link hub 15, as positions that allow compatible movement of the plurality of the link mechanism 11-13, the intermediate link members 11c-13c are limited to move on their respective constant velocity bisecting planes. Accordingly, even when any operating angle is taken on the proximal end side and the distal end side, the constant speed rotation can be obtained.

The bearings are provided in the four connection portions of the four revolute pairs in each link mechanism 11-13, i.e., the connection portion between the proximal end side link hub 14 and the proximal side end link member 11a-13a; the connection portion between the distal end side link hub 15 and the distal side end link member 11b-13b; connection portion between the intermediate link member 11c-13c and the proximal side end link members 11a-13a; and connection portion between the intermediate link member 11c-13c and the distal side end link members 11b-13b. Accordingly, the frictional resistance in each connection portion can be reduced, whereby the rotational resistance can be reduced. Accordingly, smooth power transmission can be ensured and durability can be increased.

With this configuration of the link actuation device body 2, a wide range of movement of the distal end side link hub 15 relative to the proximal end side link hub 14 can be realized. For example, the maximum value of the bend angle θ (maximum bend angle) between the central axis QA of the proximal end side link hub 14 and the central axis QB of the distal end side link hub 15 can be about ±90°. Moreover, the angle of traverse φ of the distal end side link hub 15 relative to the proximal end side link hub 14 can be set in a range of 0° to 360°.

With reference to FIG. 1 and FIG. 2, the plurality of the actuators 3 are arranged at an equal interval in the circumferential direction on the support member 5. The number of the actuators 3 is three, which is the same number of the link mechanisms 11, 12, and 13. However, even if the number of the actuators 3 is two, the operation of the link actuation device body 2 can be defined. In the present embodiment, each actuator 3 is implemented by a motor, and a pinion 30 is provided at an output shaft 3a of the actuator 3. On the other hand, a connection member 31 (FIG. 5) is fixed to the revolute pair portion between the shaft portion 18 and the proximal side end link member 11a-13a, and a sector gear 32 meshed with the pinion 30 is provided to the connection member 31. The central axis of the sector gear 32 is aligned with the central axis of the shaft portion 18 (FIG. 5). The pinion 30 and the sector gear 32 cooperate together to form a speed reducing mechanism 33.

When each actuator 3 is driven to rotate, its rotation is transmitted to the shaft portion 18 (FIG. 5) via a speed reducing mechanism 33, whereby the angle of the arm 11a-13a, which is the proximal side end link member relative to the proximal end side link hub 14, is changed. Accordingly, the posture of the distal end side link hub 15 relative to the proximal end side link hub 14 is determined. This posture is defined by the bend angle θ (FIG. 3) and the angle of traverse φ (FIG. 3). The rotation angle β1, β2, β3 of the arm 11a-13a is calculated from a value detected by a rotation angle detector 35 and a value of the speed reduction ratio of the speed reducing mechanism 33.

The control device 4 will be described with reference to FIG. 1. The control device 4 is operable to control each actuator 3 such that: the posture of the distal end side link hub 15 relative to the proximal end side link hub 14 is changed from a start point posture to an end point posture; and at that time, the work point moves along the trajectory on the work surface 60 at a target moving speed V set by a command input device 40. The work point is, for example, the distal end of the end effector 8.

The start point posture is the current posture, and the start point of the individual arm 11a-13a is the current position of the arm 11a-13a. In the present embodiment, the start point is the end point in the immediately-preceding movement, but may be a current position calculated from a value detected by the rotation angle detector 35 and a value of the speed reduction ratio of the speed reducing mechanism 33, or may be a specified reference position. The start point posture may be specified from the command input device 40 which is provided outside the control device 4.

The command input device 40 may be an apparatus, such as a keyboard or a mouse, that performs input in accordance with operation made by an operator, or may be a control device of a higher order than the control device 4, communication device that obtains information from external information apparatuses, or driver for a storage medium.

The control device 4 is of a computer numerical control type and includes a divided section setter 42, an arm rotation speed calculator 43, a section correspondence setting information memory 46, and a posture change controller 41.

The divided section setter 42 divides, into a plurality of sections at one or a plurality of pass points, the trajectory from a start point to an end point along which the end effector 8 moves, the trajectory being on the work surface 60 on which the end effector 8 works, and sets the position(s) of the pass point(s). The trajectory from the start point to the end point on the work surface 60 is inputted in rectangular coordinates through the command input device 40, and each pass point is also expressed in rectangular coordinates in the divided section setter 42.

Here, the division number for sections is set such that the speed of the end effector 8 moving on the work surface 60 becomes a substantially constant speed. The process of dividing the trajectory into a plurality of sections at pass points may be instructed by the operator making an input through the command input device 40. Alternatively, by causing the divided section setter 42 to have a dividing function, the trajectory may be automatically divided. When a configuration is employed in which the operator makes the input, the divided section setter 42 is simply operable to store coordinates of the start point, the end point and the pass point.

In a configuration where the divided section setter 42 calculates pass points to set sections, the trajectory from the start point to the end point is equally divided by a constant division number, for example, in accordance with a specified rule; and the arm rotation speed calculator 43 calculates the rotation speed and determines whether control (constant speed control) can be performed such that a substantially constant speed is realized from the start point to the end point. When the constant speed control cannot be realized, the sections may be determined through a process in which: with the division number changed, the arm rotation speed calculator 43 repeats the process of calculating the rotation speed until determining that the constant speed control can be realized.

On the basis of: the time period of movement in each section determined from the distance of the section and the target moving speed inputted and designated through the command input device 40 by the operator; and the rotation-angular movement amount of the arm 11a, 12a, 13a in the section, the arm rotation speed calculator 43 calculates the rotation speed at which the arm 11a, 12a, 13a performs constant speed rotation in the section.

For each section, the section correspondence setting information memory 46 stores the position of the point, which is the start point, the pass point or the end point that corresponds to the section for the arm 11a, 12a, 13a, and the arm rotation speed, both having been calculated by the arm rotation speed calculator 43.

The posture change controller 41 sets the rotation speed of the arm 11a-13a in each section to the value calculated by the rotation speed calculation means 43, and performs positioning control on the actuator 3 corresponding to the arm 11a-13a so as to cause the arm 11a-13a to continuously rotate without acceleration/deceleration in the section. The posture change controller 41 includes a command readout unit 51, a synchronization control unit 52 and individual control units 53, number of the individual control units 53 being the same as that of the actuators 3.

The command readout unit 51 reads out the arm rotation speed and the position of the point in each section of the arm 11a, 12a, 13a stored in the section correspondence setting information memory 46. Instead of reading out from the section correspondence setting information memory 46, the command readout unit 51 may be configured to read out the arm rotation speed and the position of the point in each section of the arm 11a, 12a, 13a from the arm rotation speed calculator 43. The synchronization control unit 52 is operable to cause the respective individual control units 53 to perform synchronized control such that the arms 11a-13a simultaneously start rotating at the start point and simultaneously stop at the end point.

Each individual control unit 53 performs point-to-point positional control on its corresponding actuator 3, from the point to the point that have been given. Specifically, each individual control unit 53 includes: an operation amount conversion unit (not shown) which converts an arm rotation angle into an actuator movement amount; an operation command generation unit (not shown); and a servo controller unit (not shown), for example. The operation command generation unit provides an operation command to the servo controller unit, for example, by sending a pulse in accordance with a speed curve of trapezoidal speed control. The servo controller unit performs feedback control by using the provided operation command and a value detected by the rotation angle detector 35.

Figure 6:
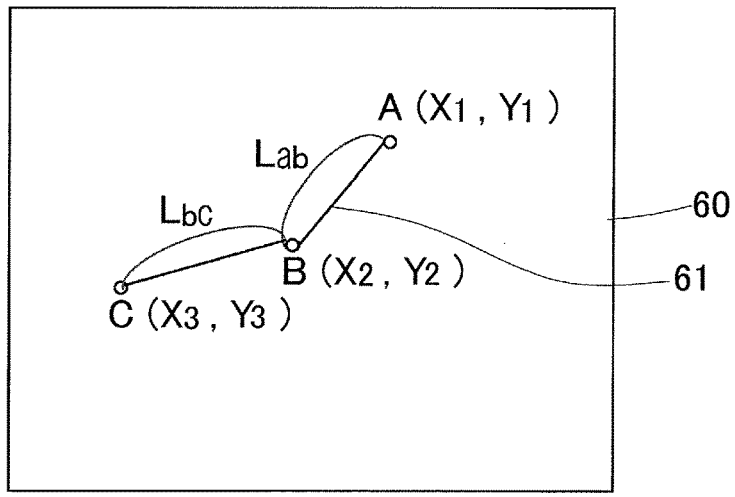
FIG. 6 is a diagram of a rectangular coordinate system indicating a simplified example of a trajectory on a work surface being a flat surface on which an end effector mounted on the link actuation device works.

A specific method for calculating rotation speed to be used in the arm rotation speed calculator 43 will be described. First, a simple example will be explained. FIG. 6 shows arbitrary three points (A, B, C) on the work surface 60 being a flat surface on which the end effector 8 works. The three points (A, B, C) are expressed in X-Y rectangular coordinates. When the distance between the point A and the point B is defined as Lab and the distance between the point B and the point C is defined as Lbc, Lab and Lbc are expressed as the following formulae.

$$L_{ab} = \sqrt{(X_2-X_1)^2 + (Y_2-Y_1)^2}$$

$$L_{bc} = \sqrt{(X_3-X_1)^2 + (Y_3-Y_2)^2}$$ [Math 1]

When the speed (tracing speed) on the flat work surface 60 of the end effector 8 is defined as V, a time period Tab in which the end effector 8 moves the distance Lab and a time period Tbc in which the end effector 8 moves the distance Lbc are expressed as the following formulae. The speed V is the target moving speed. The calculation is performed assuming that the acceleration/deceleration time period is zero.

$$Tab = Lab/V$$

$$Tbc = Lbc/V$$

When the postures (bend angle, angle of traverse) of the link hub at the points A, B, and C are defined as a posture A($\theta a$, $\phi a$), a posture B($\theta b$, $\phi b$), and a posture C($\theta c$, $\phi c$), the respective arm rotation angles corresponding to the postures A, B, and C are expressed as a rotation angle A($\beta 1a$, $\beta 2a$, $\beta 3a$), a rotation angle B($\beta 1b$, $\beta 2b$, $\beta 3b$), and a rotation angle C($\beta 1c$, $\beta 2c$, $\beta 3c$) according to Formula (1) regarding the link hub and the arm rotation angle. When the rotation-angular movement amounts about the $\beta 1$ axis, the $\beta 2$ axis, and the $\beta 3$ axis during movement from the point A to the point B are defined as $\Delta \beta 1ab$, $\Delta \beta 2ab$ and $\Delta \beta 3ab$, moving speeds V1$ab$, V2$ab$ and V3$ab$ which are the rotation speeds about the respective axes are expressed as the following formulae. It should be noted that the movements about the $\beta 1$ axis, the $\beta 2$ axis, and the $\beta 3$ axis mean rotations about the rotation centers of the arms 11a-13a, respectively.

[Math 2]

$$V1_{ab} = \frac{|\Delta \beta 1_{ab}|}{T_{ab}} = \frac{|\beta 1_a - \beta 1_b|}{T_{ab}}$$

$$V2_{ab} = \frac{|\Delta \beta 2_{ab}|}{T_{ab}} = \frac{|\beta 2_a - \beta 2_b|}{T_{ab}}$$

$$V3_{ab} = \frac{|\Delta \beta 3_{ab}|}{T_{ab}} = \frac{|\beta 3_a - \beta 3_b|}{T_{ab}}$$

Similarly to the above, when the respective movement amounts about the $\beta 1$ axis, the $\beta 2$ axis, and the $\beta 3$ axis during movement from the point B to the point C are defined as $\Delta \beta 1bc$, $\Delta \beta 2bc$ and $\Delta \beta 3bc$, moving speeds V1$bc$, V2$bc$ and V3$bc$ about the respective axes are expressed as the following formulae.

[Math 3]

$$V1_{bc} = \frac{|\Delta \beta 1_{bc}|}{T_{bc}} = \frac{|\beta 1_b - \beta 1_c|}{T_{bc}}$$

$$V2_{bc} = \frac{|\Delta \beta 2_{bc}|}{T_{bc}} = \frac{|\beta 2_b - \beta 2_c|}{T_{bc}}$$

$$V3_{bc} = \frac{|\Delta \beta 3_{bc}|}{T_{bc}} = \frac{|\beta 3_b - \beta 3_c|}{T_{bc}}$$

When the end effector 8 mounted on the distal end side link hub 15 performs tracing operation along the three points A to B to C on the work surface 60 being a flat surface, the arm rotation speed calculator 43 sets, for each section, the respective movement amounts about the $\beta 1$ axis, the $\beta 2$ axis and the $\beta 3$ axis and the speeds obtained by the above formulae, whereby continuous positioning control without acceleration/deceleration is performed in each section. "Continuous positioning without acceleration/deceleration" means causing continuous rotation to be performed without making a stop.

Figure 7:
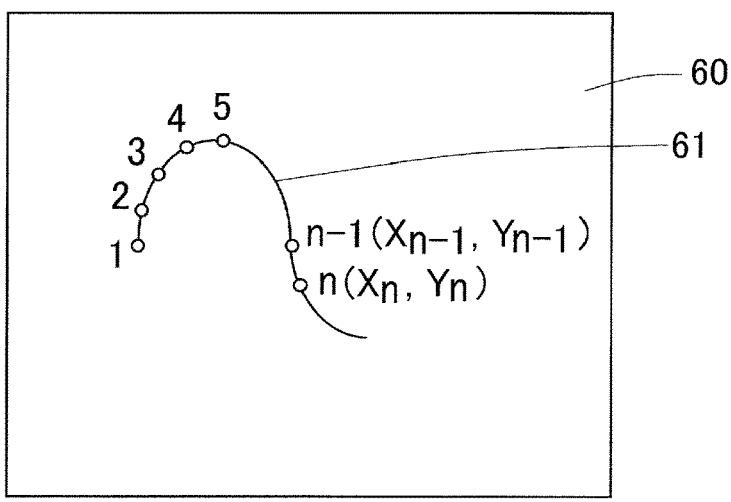
FIG. 7 is a diagram of a rectangular coordinate system indicating a generalized example of a trajectory on the work surface being a flat surface on which the end effector mounted on the link actuation device works.

FIG. 7 shows a generalized representation. As shown in FIG. 7, the end effector 8 performs tracing operation at the designated target moving speed V along the points on the work surface 60 being a flat surface. Here, the rectangular coordinates of the n-th point are defined as (Xn, Yn), the rectangular coordinates of the (n−1)th point are defined as (Xn−1, Yn−1), and the respective movement amounts about the $\beta 1$ axis, the $\beta 2$ axis and the $\beta 3$ axis from the n−1th point to the nth point are defined as $\Delta \beta 1$, $\Delta \beta 2$, and $\Delta \beta 3$. In this case, moving speeds V1$n$, V2$n$ and V3$n$ about the respective axes during movement toward the N-th point are expressed as the following formulae.

[Math 4]

$$V1_n = \frac{|\Delta \beta 1|}{T}$$ Formula (2)

$$V2_n = \frac{|\Delta \beta 2|}{T}$$ Formula (3)

$$V3_n = \frac{|\Delta \beta 3|}{T}$$ Formula (4)

$$T = \frac{\sqrt{(X_n - X_{n-1})^2 + (Y_n - Y_{n-1})^2}}{V}$$ Formula (5)

In accordance with these formulae (2) to (5), the arm rotation speed calculator 43 calculates a movement time period T of each section and the moving speeds V1$n$, V2$n$ V3$n$ about the respective axes, which are the respective arm rotation speeds in each section. Further, the arm rotation speed calculator 43 includes a command conversion unit 44. Prior to the calculation based on the formulae (2) to (5) described above, the command conversion unit 44 converts the coordinate positions of the respective points expressed in rectangular coordinates on the work surface 60, into rotations of the respective arms 11$a$-13$a$ according to the aforementioned Formula (1), and obtains the movement amounts Δβ1, Δβ2, Δβ3 about the respective axes.

According to the configuration of the present embodiment, with respect to the movement from the start point to the end point performed by the end effector 8, i.e., the movement from the start point posture A(θa, φa) to the end point posture B(θb, φb) of the distal end side link hub 15, when a plurality of divided sections are to be set by the divided section setter 42, the divided sections are set with reference to the trajectory on the work surface 60 on which the end effector 8 works.

The arm rotation speed calculator 43 calculates, for each movement in each section, rotation speeds (moving speeds about β1 axis, β2 axis and β3 axis) at which the respective arms 11$a$, 12$a$, 13$a$ perform constant speed rotation such that the speed of the end effector 8 moving on the work surface 60 becomes the constant target moving speed V from the start point to the end point. This rotation speed calculation is performed on the basis of: the time period of the movement in each section which is determined from the designated target moving speed V and the distance of the section; and the rotation-angular movement amount of the arm 11$a$, 12$a$, 13$a$ in the section.

The posture change controller 41 sets the rotation speed of the arm 11$a$-13$a$ in each section to the rotation speed calculated by the arm rotation speed calculator 43, and performs positioning control on the actuator 3 corresponding to the arm 11$a$-13$a$ so as to cause the arm 11$a$-13$a$ to continuously rotate at the set rotation speed without acceleration/deceleration in the section.

Accordingly, it is possible for the end effector 8 to operate at a substantially constant speed along a plurality of points on the work surface (rectangular coordinates) being a flat surface on which the end effector 8 works. That is, the positioning control from the start point to the end point is performed such that the end effector 8 passes arbitrary intermediate points on the work surface without acceleration/deceleration. Thus, for example, if a laser processing head, a dispenser, an ink jet nozzle, a welding machine or the like is mounted on the link as the end effector 8, it is possible to prevent occurrence of laser processing unevenness, coating unevenness due to a dispenser or ink jet, and welding unevenness due to welding.

<Second Embodiment>

Figure 8:
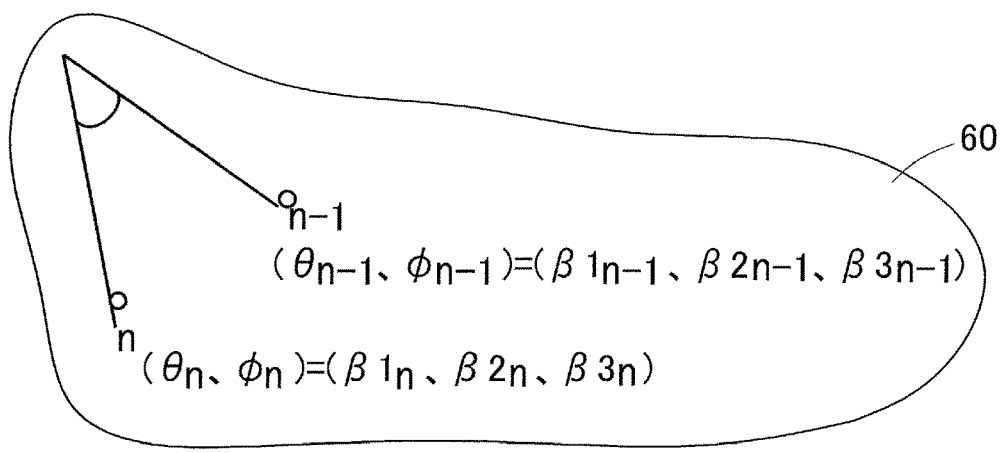
FIG. 8 is a diagram of a polar coordinate system indicating an example of a trajectory on a work surface being a spherical surface on which the end effector mounted on the link actuation device works.

A second embodiment of the present invention will be described with reference to FIG. 8. The second embodiment is the same as the first embodiment except the features to be specifically described. In the second embodiment, the divided section setter 42, the arm rotation speed calculator 43, and the section correspondence setting information memory 46 shown in FIG. 1 have functions that are partially different from those in the first embodiment. With respect to the section correspondence setting information memory 46, the values to be stored are different from those in the first embodiment.

In the first embodiment, description has been given of the constant speed movement performed when the work surface 60 of the end effector 8 is a flat surface. However, also when the work surface 60 is a spherical surface, the operation of the distal end of the end effector 8 at this spherical work surface 60 can be made into a constant speed operation similarly to the above explanation. This means that the operation of the distal end side link hub 15 is made into a constant speed operation.

The moving speed about each axis (β1 axis, β2 axis, β3 axis), at the time when the operation of the distal end side link hub 15 is made into a constant speed, will be described. As shown in FIG. 8, the postures (bend angle, angle of traverse) of the distal end side link hub 15 at two points (n−1) and n are defined as a posture A(αn−1, φn−1) and a posture B(θn, φn), respectively. The arm rotation angles corresponding to the postures A and B are expressed as a rotation angle A(β1$n$-1, β2$n$-1, β3$n$-1) and a rotation angle B(β1$n$, β2$n$, β3$n$) according to the aforementioned Formula (1). A rotation-angular movement amount γ (rad) during movement from the posture A(θn−1, φn−1) to the posture B(θn, φn) is approximated by the following formula through spherical trigonometry.

[Math 5]

$$\gamma = \cos^{-1}\{\sin(90° - \theta_{n-1}) \times \sin(90° - \theta_n) + \cos(90° - \theta_{n-1}) \times \cos(90° - \theta_n) \times \cos(\phi_n - \phi_{n-1})\}$$

When the target moving speed designated for the distal end side link hub 15 is defined as V(rad/s), the time period taken for the movement amount γ (rad) is expressed as the following formula.

$$T = \gamma/V$$

Rotation speeds V1$n$, V2$n$, V3$n$ which are the moving speeds expressed in terms of rotation angle about the respective axes during movement from the point (n−1) to the point n are expressed as the following formulae.

[Math 6]

$$V1_n = \frac{|\beta 1_n - \beta 1_{n-1}|}{T} \quad \text{Formula (6)}$$

$$V2_n = \frac{|\beta 2_n - \beta 2_{n-1}|}{T} \quad \text{Formula (7)}$$

$$V3_n = \frac{|\beta 3_n - \beta 3_{n-1}|}{T} \quad \text{Formula (8)}$$

The respective movement amounts about the β1 axis, the β2 axis, and the β3 axis and the speeds obtained by the above formulae are set for each section, i.e., for each point, whereby continuous positioning control is performed for each point without acceleration/deceleration.

With reference to FIG. 1, the divided section setter 42 shown in FIG. 1 divides, into a plurality of sections at pass points, the trajectory from the start point to the end point along which the end effector 8 moves, the trajectory being on the work surface 60 which is a spherical surface. That is, the above-described points are set. The arm rotation speed calculator 43 calculates the rotation speeds V1$n$, V2$n$, V3$n$ according to the above formulae (6) to (8), on the basis of: the time period T of movement in each section which is determined from the designated target moving speed V and the distance of the section; and the rotation-angular movement amount γ of the arms 11$a$, 12$a$, 13$a$ in the section. Here, the rotation speeds V1$n$, V2$n$, V3$n$ are moving speeds expressed in terms of rotation angle at which the arms 11a, 12a, 13a perform constant speed rotation in each section.

The posture change controller 41 sets the rotation speeds V1n, V2n, V3n of the arms 11a, 12a, 13a in each section between points, to the respective values calculated by the arm rotation speed calculator 43, and performs positioning control on the actuators 3 so as to cause the arms to continuously rotate without acceleration/deceleration in the section.

In this manner, also when the work surface 60 is a spherical surface, the end effector 8 can work while moving at a substantially constant speed on the work surface 60.

<Third Embodiment>

A third embodiment of the present invention will be described. In the third embodiment, in a case where the table device 50 shown in FIG. 2 moves thereby causing the target work piece W to be moved relative to the end effector 8 of the link actuation device 1, the speed of this relative movement is made a constant speed. The table device 50 is an XY table whose table surface moves in two axial directions orthogonal to each other, and in FIG. 2, the target work piece W is moved whose surface serves as the work surface 60 being a flat surface. However, a configuration may be employed in which the link actuation device 1 is mounted on the table device 50 and the link actuation device 1 is moved, whereas the work piece W is fixed.

The third embodiment is the same as the first embodiment except the features to be specifically described. In the third embodiment, the divided section setter 42, the arm rotation speed calculation speed calculation means 43 and the section correspondence setting information memory 46 shown in FIG. 1 have functions that are partially different from those in the first embodiment. With respect to the section correspondence setting information memory 46, the values to be stored are different from those in the first embodiment.

In the first embodiment, the position of the link actuation device 1 and the position on the work surface 60 of the target work piece W are fixed. However, when laser processing, coating, welding or the like is actually performed, it is general to employ a configuration in which the target work piece W is mounted on the XY table, i.e., on a table device whose movable table surface is movable in two axial directions orthogonal to each other, or the link actuation device 1 is mounted on the XY table.

Described is a synthesized speed (moving speed) Vn which is obtained when the end effector 8 performs constant speed movement at a designated speed V along points on the flat work surface 60 having a flat surface shape, in a system configuration of a link actuation device with table in which the link actuation device 1 is movable about the three axes (β1 axis, β2 axis, β3 axis) and the table device 50 (FIG. 2) composed of the XY table is movable in two axes (X axis, Y axis).

With respect to the rectangular coordinates of the target work piece W, the rectangular coordinates of the n-th point are defined as (Xn, Yn) and the rectangular coordinates of the (n−1)th point are defined as (Xn−1, Yn−1), as in FIG. 7. When the respective movement amounts about the β1 axis, the β2 axis and the β3 axis and in the X axis and the Y axis from the (n−1)th point to the n-th point are defined as Δβ1, Δβ2, Δβ3, Δx, and Δy, the moving speeds V1n, V2n, V3n, Vxn, and Vyn about/in the respective axes during movement toward the n-th point are expressed as the following formulae. The moving speeds about the β1 axis, the β2 axis, and the β3 axis are the moving speeds expressed in terms of rotation angle.

[Math 7]

$$V1_n = \frac{|\Delta \beta 1|}{T} \quad \text{Formula (9)}$$

$$V2_n = \frac{|\Delta \beta 2|}{T} \quad \text{Formula (10)}$$

$$V3_n = \frac{|\Delta \beta 3|}{T} \quad \text{Formula (11)}$$

$$V_{xn} = \frac{|\Delta x|}{T} \quad \text{Formula (12)}$$

$$V_{yn} = \frac{|\Delta y|}{T} \quad \text{Formula (13)}$$

$$T = \frac{\sqrt{(X_n - X_{n-1})^2 + (Y_n - Y_{n-1})^2}}{V} \quad \text{Formula (14)}$$

When the end effector 8 mounted on the distal end side link hub 15 performs tracing operation along the respective points on the work surface 60 having a flat surface shape, the arm rotation speed calculator 43 sets, for each section, i.e., for each point, the respective movement amounts about the β1 axis, the β2 axis, and the β3 axis and in the X axis and the Y axis and the speeds obtained by the above formulae, whereby continuous positioning control is performed without acceleration/deceleration along the points.

With reference to FIG. 1, the divided section setter 42 divides, into a plurality of sections at pass points, the trajectory from the start point to the end point along which the end effector 8 performs relative movement, the trajectory being on the work surface 60 which is a flat surface on which the end effector 8 performs relative movement in the XY directions. That is, the above-described points are set.

The arm rotation speed calculator 43 calculates the rotation speeds V1n, V2n, V3n according to the above formulae (9) to (11) and (14), on the basis of: the time period T of movement in each section which is determined from the designated target moving speed V and the distance of the section; and the rotation-angular movement amounts Δβ1, Δβ2, Δβ3 of the respective arm 11a, 12a, and 13a in the section. The rotation speeds V1n, V2n, V3n are moving speeds expressed in terms of rotation angle at which the arms 11a, 12a, 13a perform constant speed rotation in each section. The arm rotation speed calculator 43 may have a function of calculating, by the above formulae (12), (13), and (14), the moving speeds Vxn in the X axis and Vyn in the Y axis, in addition to the rotation speeds about the respective axes.

The posture change controller 41 sets the rotation speeds V1n, V2n, V3n of the respective arms 11a, 12a, 13a in each section between points to the respective values calculated by the arm rotation speed calculator 43, and performs positioning control on the actuators 3 so as to cause the arms to continuously rotate without acceleration/deceleration in the section. Control unit (not shown) for the X axis and the Y axis sets the moving speeds Vxn in the X axis and Vyn in the Y axis calculated according to the above formulae (12) and (13), and causes the respective axes of the table device 50 to move at the speeds.

In this manner, when the link actuation device 1 performs relative movement due to the table device 50, it is possible control the end effector 8 so as to work while moving at a substantially constant speed on the work surface 60, and while also taking the relative movement thereof into consideration.

In each of the first to third embodiments above, the control device 4 sets the position of each pass point (each section) and calculates the arm rotation speeds in each section at the time of actual use. Instead of this, a configuration may be employed in which: with respect to the position of each pass point and the rotation speeds of the arms 11a, 12a, 13a in each section, values calculated is stored in the section correspondence setting information memory 46 before actual use of the link actuation device 1, and during the actual use, the posture change controller 41 performs control by reading out the rotation speeds of the arms 11a, 12a, 13a and the positions of pass points stored in the section correspondence setting information memory 46. In this case, the device that sets/calculates before the actual use the position of the pass point and the rotation speeds of the arms 11a, 12a, 13a in each section may be provided in another computer separate from the control device 4 including the posture change controller 41.

There are cases where the same work is repeated by using the link actuation device 1. In such a case, if the rotation speeds of the arms 11a, 12a, 13a in each section is stored in the section correspondence setting information memory 46 in advance and the posture change controller 41 performs control by reading out the stored contents, it is not necessary to perform setting of sections and calculation of the rotation speeds every time, and thus, control can be performed easily and quickly. Even when work is performed only once, there are cases where it is convenient that sections and arm rotation speeds are calculated and set in advance. The above "during the actual use" means the time when working or processing is actually performed by the end effector 8, excluding trial run.

The present invention is not limited to the embodiments described above, and various additions, modifications, or deletions may be made without departing from the gist of the invention. Therefore, these are construed as included within the scope of the present invention.

REFERENCE NUMERALS

1 . . . link actuation device
3 . . . actuator
4 . . . control device
8 . . . end effector
14 . . . proximal end side link hub
15 . . . distal end side link hub
11-13 . . . link mechanism
11a, 12a, 13 a . . . proximal side end link member (arm)
11b, 12b, 13b . . . distal side end link member
11c, 12c, 13c . . . intermediate link member
40 . . . command input device
41 . . . posture change controller
42 . . . divided section setter
43 . . . arm rotation speed calculator
44 . . . command conversion unit
50 . . . table device
60 . . . work surface
61 . . . trajectory

What is claimed is:

1. A control device configured to control a link actuation device, the link actuation device including a proximal end side link hub, a distal end side link hub, and three or more link mechanisms which each connects the distal end side link hub to the proximal end side link hub such that a posture of the distal end side link hub can be changed relative to the proximal end side link hub, wherein each of the link mechanisms includes a proximal side end link member having one end rotatably connected to the proximal end side link hub, a distal side end link member having one end connected to the distal end side link hub, and an intermediate link member having opposite ends rotatably connected to other ends of the proximal side end link member and the distal side end link member, respectively, a geometric model of each of the link mechanisms showing rotation symmetry relative to a center line of the intermediate link member, two or more link mechanisms among the three or more link mechanisms are each provided with an actuator to changes the posture of the distal end side link hub relative to the proximal end side link hub by causing an arm, forming the proximal side end link member, to rotate, and the distal end side link hub has an end effector installed thereon, the control device comprising:

a divided section setter configured to divide, into a plurality of sections at one or more pass points, a trajectory from a start point to an end point along which the end effector moves, the trajectory being on a work surface on which the end effector works, the divided section setter being configured to set a position of each of the one or more pass points;

an arm rotation speed calculator configured to calculate a rotation speed at which each arm performs constant speed rotation in each section, on the basis of a time period of movement in the section which is determined from a distance of the section and a target moving speed which has been designated and is a constant speed, and a rotation-angular movement amount of the arm in the section; and a posture change controller configured to set the rotation speed of the arm in the section to a value of the rotation speed calculated by the arm rotation speed calculator and to perform positioning control on the actuator corresponding to the arm so as to cause the arm to continuously rotate without acceleration/deceleration in the section.

2. The control device for the link actuation device as claimed in claim 1, wherein the work surface on which the end effector works is a flat surface.

3. The control device for the link actuation device as claimed in claim 2, wherein the arm rotation speed calculator calculates the rotation speed of the arm toward a point that is one of the start point, the end point and the one or more pass points, on the basis of:

a time period which is obtained from the target moving speed and a distance between arbitrary two points in a rectangular coordinate system representing the work surface; and the rotation-angular movement amount of the arm between the two points.

4. The control device for the link actuation device as claimed in claim 1, wherein the work surface on which the end effector works is a spherical surface.

5. The control device for the link actuation device as claimed in claim 4, wherein the arm rotation speed calculator calculates the rotation speed of the arm toward a point that is one of the start point, the end point and the pass points, on the basis of:

a time period which is obtained from the target moving speed and a movement amount between arbitrary two points obtained through spherical trigonometry; and the rotation-angular movement amount of the arm between the two points.

6. The control device for the link actuation device as claimed in claim 1, further comprising a section correspondence setting information memory configured to, with respect to the position of the pass point corresponding to the section and the rotation speed of the arm in the section, store values calculated before actual use of the link actuation device, wherein during the actual use, the posture change controller performs control by reading out the position of the pass point and the rotation speed of the arm which are stored in the section correspondence setting information memory.

7. A control method of a control device for controlling a link actuation device, the link actuation device including a proximal end side link hub, a distal end side link hub, and three or more link mechanisms which each connects the distal end side link hub to the proximal end side link hub such that a posture of the distal end side link hub can be changed relative to the proximal end side link hub, wherein each of the link mechanisms includes a proximal side end link member having one end rotatably connected to the proximal end side link hub, a distal side end link member having one end connected to the distal end side link hub, and an intermediate link member having opposite ends rotatably connected to other ends of the proximal side end link member and the distal side end link member, respectively, a geometric model of each of the link mechanisms showing rotation symmetry relative to a center line of the intermediate link member, two or more link mechanisms among the three or more link mechanisms are each provided with an actuator to change the posture of the distal end side link hub relative to the proximal end side link hub by causing an arm, forming the proximal side end link member, to rotate, and the distal end side link hub has an end effector installed thereon, the control method of the control device comprising:

dividing, into a plurality of sections at one or more pass points, a trajectory from a start point to an end point along which the end effector moves, the trajectory being on a work surface on which the end effector works;

calculating a rotation speed of each arm in each section, on the basis of a time period of movement in the section which is determined from a distance of the section and a designated target moving speed, and a rotation-angular movement amount of the arm in the section; and setting the rotation speed of the arm in the section to a calculated value of the rotation speed, to perform positioning control on the actuator corresponding to the arm so as to cause the arm to continuously rotate without acceleration/deceleration in the section, thereby causing the end effector to operate at a substantially constant speed from the start point to the end point through the plurality of sections between a plurality of points on the work surface.

* * * * *

UNITED STATES PATENT AND TRADEMARK OFFICE
CERTIFICATE OF CORRECTION

PATENT NO. : 10,065,310 B2
APPLICATION NO. : 15/233409
DATED : September 4, 2018
INVENTOR(S) : Seigo Sakata et al.

Page 1 of 1

It is certified that error appears in the above-identified patent and that said Letters Patent is hereby corrected as shown below:

In the Claims

Column 20, Line 10, In Claim 1, delete "changes" and insert -- change --, therefore.

Signed and Sealed this
Sixth Day of November, 2018

Andrei Iancu
*Director of the United States Patent and Trademark Office*